US011261814B1

(12) United States Patent
Uphues et al.

(10) Patent No.: US 11,261,814 B1
(45) Date of Patent: Mar. 1, 2022

(54) SYSTEM AND METHOD FOR DETECTING ENGINE MISFIRE

(71) Applicant: Ford Global Technologies, LLC, Dearborn, MI (US)

(72) Inventors: Marc G Uphues, Ann Arbor, MI (US); Allen Lehmen, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/151,998

(22) Filed: Jan. 19, 2021

(51) Int. Cl.
*F02P 5/14* (2006.01)
*F02D 41/14* (2006.01)
*F02D 41/38* (2006.01)
*F02D 41/00* (2006.01)

(52) U.S. Cl.
CPC ....... *F02D 41/1498* (2013.01); *F02D 41/009* (2013.01); *F02D 41/1446* (2013.01); *F02D 41/38* (2013.01); *F02P 5/14* (2013.01); *F02D 2041/389* (2013.01); *F02D 2200/101* (2013.01)

(58) Field of Classification Search
CPC .... F02D 41/1498; F02D 41/38; F02D 41/009; F02D 41/1446; F02D 2041/389; F02D 2200/101; F02P 5/14
USPC .............. 123/435, 672, 676, 406.14, 406.27; 701/103, 111; 73/114.02
See application file for complete search history.

(56) References Cited

U.S. PATENT DOCUMENTS

| | | | |
|---|---|---|---|
| 7,086,386 B2 | 8/2006 | Doering | |
| 7,234,446 B2 | 6/2007 | Toyoda | |
| 7,243,532 B2 | 7/2007 | Tsujimura et al. | |
| 7,389,683 B2 | 6/2008 | Beer et al. | |
| 7,571,640 B2 * | 8/2009 | Andrews | G01M 15/11 73/114.07 |
| 7,650,223 B2 * | 1/2010 | Shiraishi | F02M 21/0275 701/103 |
| 8,091,538 B2 | 1/2012 | Hartmann et al. | |
| 9,038,596 B2 | 5/2015 | Glugla et al. | |
| 9,243,978 B2 | 1/2016 | Wada | |
| 9,599,048 B2 | 3/2017 | Glugla et al. | |
| 9,683,535 B2 | 6/2017 | Glugla et al. | |
| 9,951,703 B2 | 4/2018 | Pathan et al. | |
| 2013/0158841 A1 * | 6/2013 | Ito | F02D 41/0085 701/104 |
| 2013/0184973 A1 * | 7/2013 | Okazaki | F02D 41/1475 701/104 |

OTHER PUBLICATIONS

Van, H. et al., "Misfire Detection on Internal Combustion Engine Based on Fluctuation of Exhaust Gas Temperature," Proceedings of the 2018 IEEE International Conference on Prognostics and Health Management (ICPHM), Jun. 11, 2018, Seattle, Washington, 6 pages.

* cited by examiner

*Primary Examiner* — Hai H Huynh
(74) *Attorney, Agent, or Firm* — Geoffrey Brumbaugh; McCoy Russell LLP

(57) ABSTRACT

Systems and methods determining a presence or absence of engine misfire at low engine load are disclosed. In one example, the presence or absence of engine misfire is based on a fuel target error value and an exhaust temperature error. Operation of an engine may be adjusted when engine misfire is detected.

19 Claims, 4 Drawing Sheets

SYSTEM AND METHOD FOR DETECTING ENGINE MISFIRE

FIELD

The present description relates to methods and systems for detecting engine misfires. The methods may be applied at low engine loads when it may be difficult to detect engine misfires via crankshaft speed changes.

BACKGROUND AND SUMMARY

An engine may misfire from time to time. Misfires may increase tailpipe emissions and cause the engine to run rough. In addition, misfires may cause raw hydrocarbons to deposit on a catalyst in the engine's exhaust system. The raw hydrocarbons may be oxidized on the catalyst, thereby increasing a temperature of the catalyst. If catalyst temperature exceeds a threshold temperature, catalyst degradation may occur.

Misfires may be easier to detect when engine load is high as compared to when engine load is low. Misfires at higher engine loads may cause noticeable changes in engine speed. However, misfires may be more difficult to detect at low engine loads since engine speed may not change much in the presence of a small number of engine misfires. Therefore, it may be desirable to provide a way of detecting misfires at low engine loads.

The inventors herein have recognized the above-mentioned issues and have developed a method for operating an engine, comprising: combining a fuel target error and an exhaust temperature error to identify a presence of misfire in the engine; and adjusting operation of the engine in response to identifying the presence of misfire in the engine.

By determining a presence or absence of engine misfire based on a fuel target error and an exhaust temperature error, it may be possible to provide the technical result of evaluating an engine for a presence of misfire when the engine is operating at low loads. In particular, a rich misfire fraction value that is generated from the fuel target error and the exhaust temperature error may correlate well with detected engine misfires. Consequently, engine misfires may be detected without having to rely on engine speed variations.

The present description may provide several advantages. In particular, the methods may provide a more reliable indication of engine misfires at low engine load. In addition, the indication of engine misfire may be provided with existing sensors so that system cost may be maintained. In addition, the approach may be combined with other approaches to determine engine misfires over a large engine operating range.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
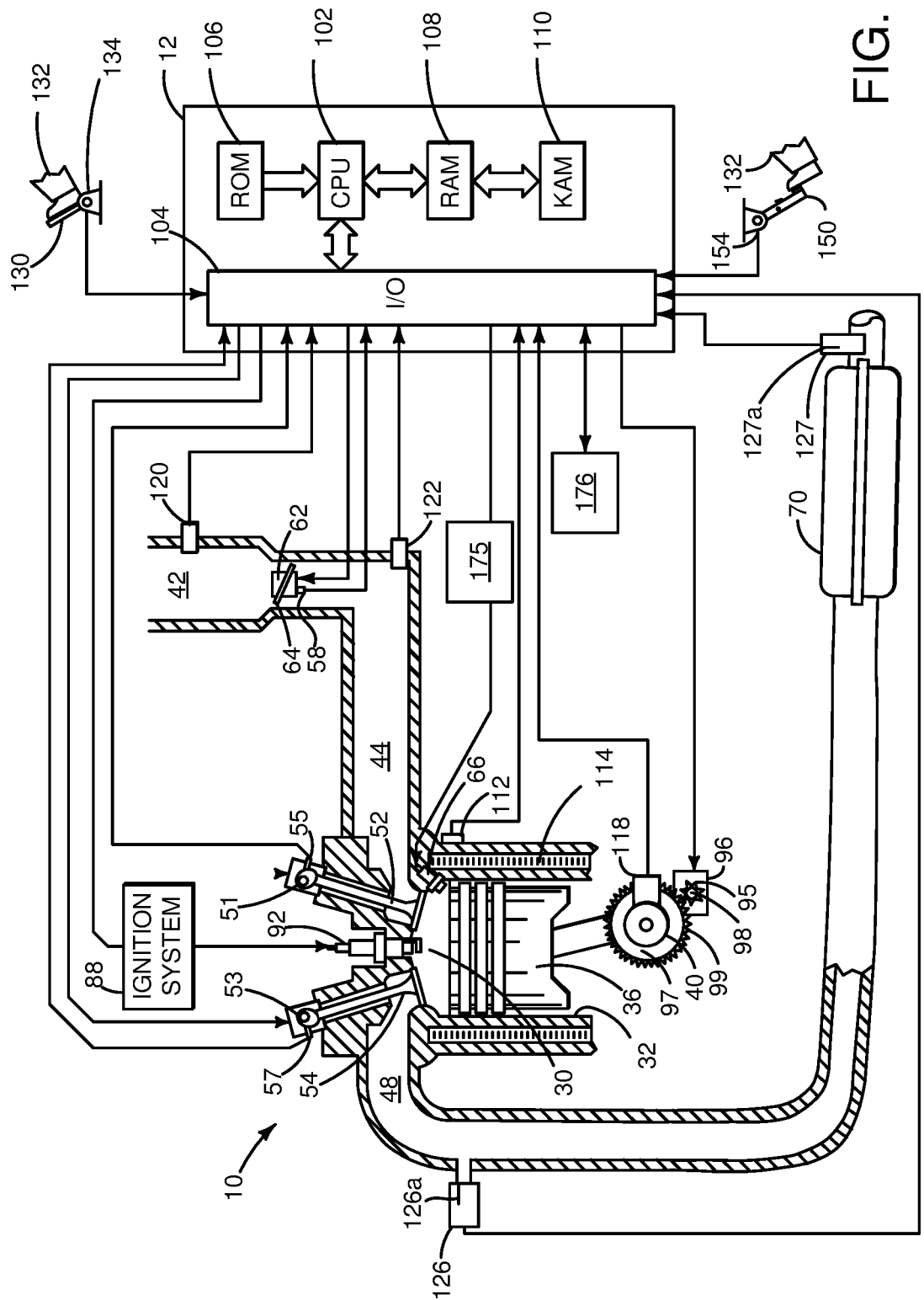
FIG. 1 is a schematic diagram of an engine.
Figure 2:
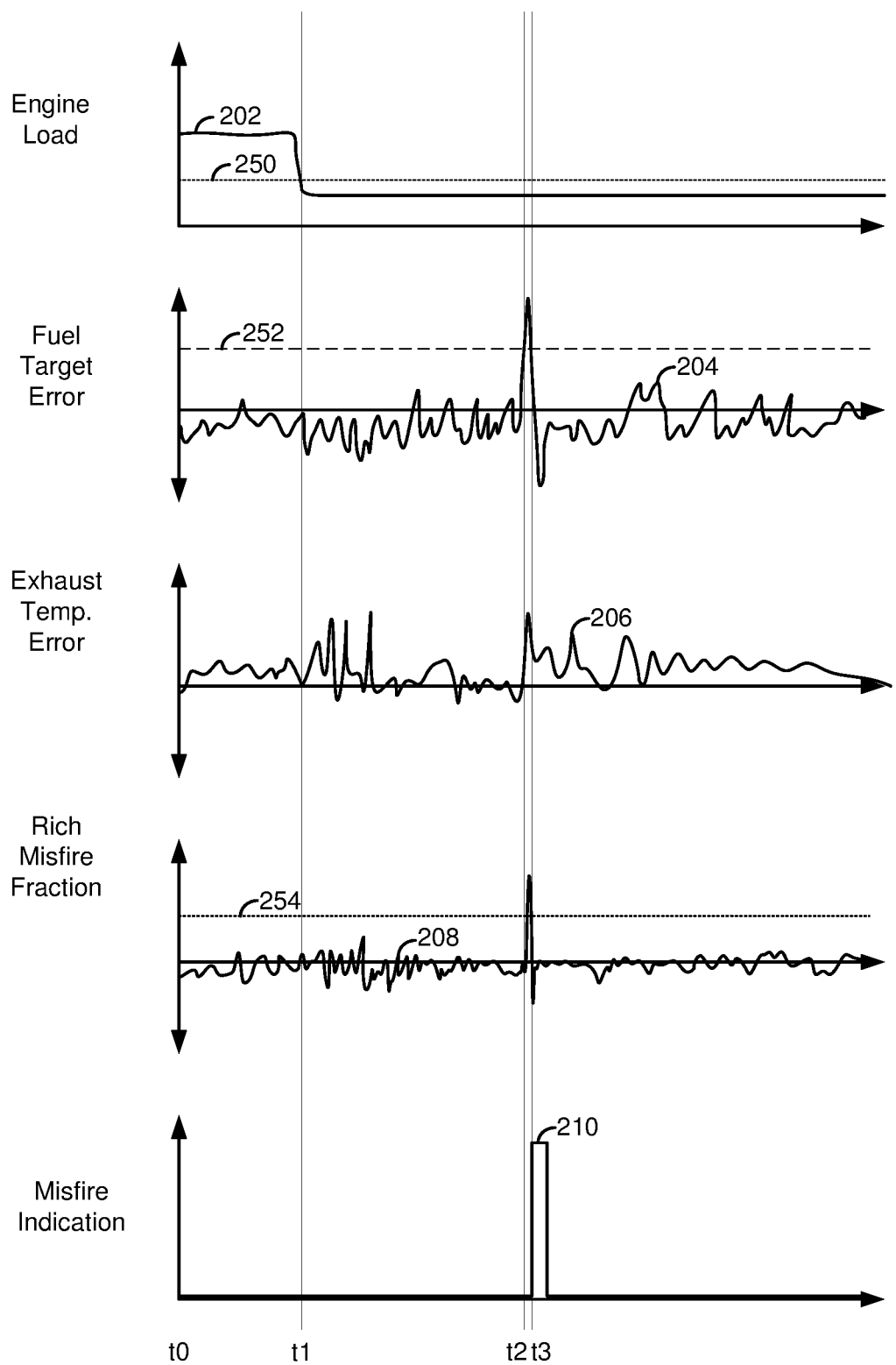
FIG. 2 is a prophetic example of engine misfire detection according to the method of FIG. 3.
Figure 3:
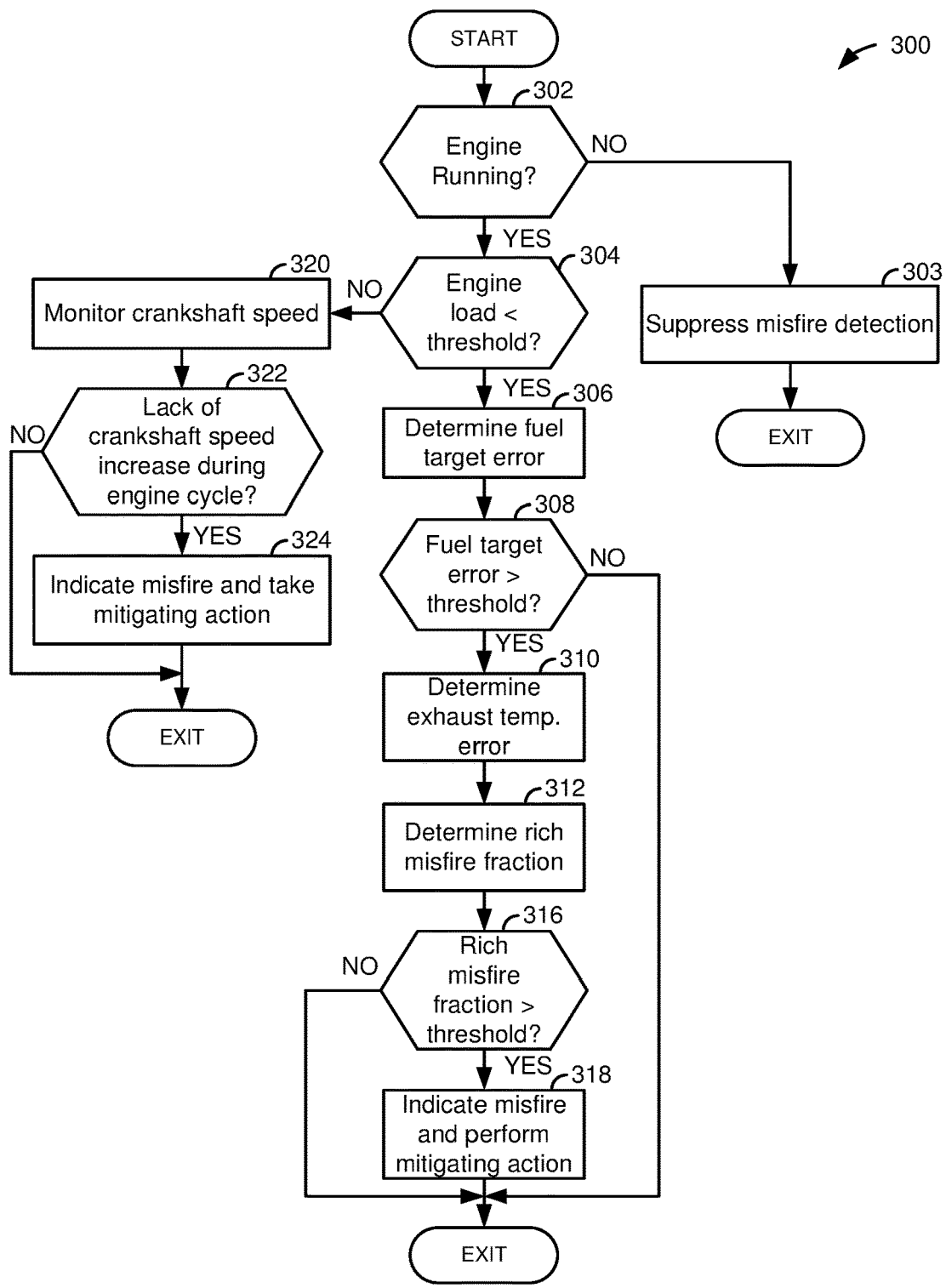
FIG. 3 shows a first method for determining a presence or absence of engine misfire.

The present description is related to judging a presence or absence of engine misfire. The approach utilizes a fueling error and an exhaust temperature error to make an assessment of the presence or absence of engine misfire. This approach may be more reliable than other approaches when an engine is operating at low load. The present method may be applied to an engine of the type that is shown in FIG. 1. A prophetic engine operating sequence where engine misfire is detected is shown in FIG. 2. A method for assessing the presence or absence of engine misfire is shown in FIG. 3.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system 175 shown in greater detail in FIG. 2. In addition, intake manifold 44 is shown communicating with optional electronic throttle 62 which adjusts a position of throttle plate 64 to control air flow from air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126. Oxygen sensor 126 may include a thermocouple 126*a* for determining exhaust gas temperature at an exhaust manifold flange.

Converter 70 can include multiple catalyst bricks, in one example. In another example, multiple emission control devices, each with multiple bricks, can be used. Converter 70 can be a three-way type catalyst in one example. A catalyst monitoring oxygen sensor 127 is shown positioned downstream of catalyst 70. Catalyst monitoring sensor 127 may be a two state exhaust gas oxygen sensor. In addition, catalyst monitoring sensor 127 may include a thermocouple 127*a* or other temperature measuring device to determine exhaust gas temperature from which a temperature of catalytic converter 70 may be determined.

Human/machine interface 176 may allow a human (not shown) to provide input to controller 12. In addition, controller 12 may display engine operating data, status data, and control parameters via human/machine interface 176. In one example, human/machine interface may be a touch screen display. In other examples, human/machine interface may be a display and a keyboard or speech input device. In other examples, human/machine interface may be as simple as a light and a pushbutton or key switch.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to propulsive effort pedal 130 for sensing force applied by human driver 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; brake pedal position from brake pedal position sensor 154 when driver 132 applies brake pedal 150; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Thus, the system of FIG. 1 provides for a misfire detection system, comprising: an engine; and a controller including executable instruction stored in non-transitory memory that cause the controller to adjust operation of the engine in response to engine misfire, the engine misfire inferred from a fuel target error and an exhaust temperature error. The misfire detection system includes where adjusting operation of the engine included adjusting an engine air-fuel ratio. The misfire detection system includes where adjusting operation of the engine includes adjusting spark timing. The misfire detection system further comprises additional instructions to multiply the fuel target error and the exhaust temperature error to determine a rich misfire fraction. The misfire detection system further comprises additional instructions to infer the engine misfire from the rich misfire fraction. The misfire detection system includes where the engine misfire is inferred when the rich misfire fraction exceeds a threshold level.

In some examples, the misfire detection system further comprises additional instructions to begin inferring the engine misfire in response to the fuel target error exceeding a threshold level. The misfire detection system further comprises determining a presence or absence of engine misfire in response to engine crankshaft speed when engine load is greater than a threshold engine load.

Referring now to FIG. 2, a prophetic sequence during which engine misfire is detected according to the method of FIG. 3 is shown. The sequence of FIG. 2 may be generated via the system of FIG. 1 in cooperation with the method of FIG. 3.

The first plot from the top of FIG. 2 is a plot of engine load versus time. The vertical axis represents engine load and engine load increases in the direction of the vertical axis arrow. The horizontal axis represents time and time increases in the direction of the horizontal axis arrow. Trace 202 represents engine load. Horizontal line 250 represents a threshold level below which engine load is considered low.

The second plot from the top of FIG. 2 is a plot of a fuel target error versus time. The vertical axis represents fuel target error and fuel target error magnitude increases in the directions above and below the horizontal axis. The horizontal axis represents time and time increases in the direction of the horizontal axis arrow. The fuel target error at the level of the horizontal axis is zero. Trace 204 represents fuel target error. Horizontal line 252 represents a threshold level above which engine misfire is determined via a rich misfire fraction.

The third plot from the top of FIG. 2 is a plot of engine exhaust temperature error versus time. The vertical axis represents engine exhaust temperature error and engine exhaust temperature error magnitude increases in the directions above and below the horizontal axis. The horizontal axis represents time and time increases in the direction of the horizontal axis arrow. The engine exhaust temperature error at the level of the horizontal axis is zero. Trace 206 represents engine exhaust temperature error.

The fourth plot from the top of FIG. 2 is a plot of an engine rich misfire fraction versus time. The vertical axis represents an engine rich misfire fraction engine and engine rich misfire fraction magnitude increases in the direction above and below the horizontal axis. The horizontal axis represents time and time increases in the direction of the horizontal axis arrow. Trace 208 represents engine rich misfire fraction. Horizontal line 254 represents a threshold level above which engine misfire is determined to be present.

The fifth plot from the top of FIG. 2 is a plot of an engine misfire indication versus time. The vertical axis represents engine misfire indication and engine misfire indication is present when trace 210 is near the vertical axis arrow. Engine misfire indication is not present when trace 210 is at the level of the horizontal axis. The horizontal axis represents time and time increases in the direction of the horizontal axis arrow. Trace 210 represents engine misfire indication.

At time t0, the engine load is at a higher level and target fuel error value is low.

Likewise, the exhaust temperature error and the rich misfire fraction are at lower levels. Engine misfire is not indicated.

At time t1, the engine load is reduced to less than threshold 250 in response to a vehicle operator reducing application of the propulsive effort pedal (not shown). The fuel target error remains low as does the exhaust temperature error. The rich misfire fraction remains below threshold 254. Engine misfire is not indicated.

At time t2, the fuel target error value exceeds threshold 252 so the engine is assessed for misfires. The exhaust temperature error increases shortly after time t2 and the rich misfire fraction also increases shortly thereafter.

At time t3, the rich misfire fraction exceeds threshold 254, so engine misfire is indicated. The exhaust temperature error and the fuel target error begin to return to lower values after a single indication of engine misfire is generated.

Thus, an indication of engine misfire may be generated from a rich misfire fraction. The rich misfire fraction may be based on a fuel target error and exhaust temperature error.

Referring now to FIG. 3, a method for determining a presence or absence of engine misfire is shown. The method may be included in the system of FIG. 1 as executable instructions stored in non-transitory memory of controller 12. The method of FIG. 3 may cause controller 12 to transform operating states of devices and actuators in the physical world.

At 302, method 300 judges whether or not the engine is running (e.g., combusting fuel and rotating). In one example, method 300 may judge that the engine is running when engine speed is greater than a threshold speed (e.g., 300 RPM). If method 300 judges that the engine is running, the answer is yes and method 300 proceeds to 304. Otherwise, the answer is no and method 300 proceeds to 303.

At 303, method 300 suppresses engine misfire detection. Misfire calculations are not determined and engine misfires are not indicated since the engine is stopped. Method 300 proceeds to exit.

At 304, method judges whether or not engine load is low. Method 300 may judge that engine load is low if engine load is less than a predetermined level (e.g., 0.2). If method 300 judges that engine load is low, the answer is yes and method 300 proceeds to 306. Otherwise, the answer is no and method 300 proceeds to 320.

At 320, method 300 monitors engine speed. Method 300 may monitor engine speed via an engine position sensor. Method 300 proceeds to 322.

At 322, method 300 judges if there is a lack of engine speed increase during a crankshaft angular interval where a cylinder is expected to fire. If so, the answer is yes and method 300 proceeds to 324. Alternatively, method 300 may judge if crankshaft speed is decreasing during a crankshaft interval. If so, the answer is yes and method 300 proceeds to 324. Otherwise, the answer is no and method 300 proceeds to exit.

At 324, method 300 indicates an engine misfire responsive to engine speed. If method 300 indicates misfire, method 300 may retard spark timing to reduce a possibility of additional misfires in the cylinder. Further, method 300 may adjust the engine's air-fuel ratio in response to the indication of misfire. For example, method 300 may adjust an air-fuel ratio of the engine or a particular cylinder to a leaner value to reduce a possibility of engine misfire. Method 300 proceeds to exit.

At 306, method 300 determines a fuel target error value. In one example, method 300 may determine the fuel target error value according to the following equation:

$$\lambda_{error} = \lambda_{Target} - \lambda_{actual}$$

where $\lambda_{error}$ is the fuel target error value, $\lambda_{Target}$ is the target Lambda value, $\lambda_{actual}$ is the actual Lambda value at the present time. The Lambda values $\lambda_{Target}$ and $\lambda_{actual}$ may be determined by dividing the target or actual air-fuel ratio by the stoichiometric air-fuel ratio of the fuel that is being combusted in the engine. For example, $\lambda_{Target}$=target air-fuel ratio/stoichiometric air-fuel ratio. Method 300 proceeds to 308.

At 308, method 300 judges if the fuel target error value is greater than a threshold value (e.g., 0.15). If so, the answer is yes and method 300 proceeds to 310. Otherwise, the answer is no and method 300 proceeds to exit.

At 310, method 300 judges if the exhaust temperature error is greater than a threshold value. In one example, the exhaust temperature error may be determined via the following equation:

$$Gas_{Error} = Gas_{Model} - Gas_{actual}$$

where $Gas_{Error}$ is the exhaust gas temperature error, $Gas_{Model}$ is exhaust gas temperature at the engine's exhaust flange as determined via a model, and $Gas_{actual}$ is the actual exhaust gas temperature at the engine's exhaust flange, which may be determined via an oxygen sensor's integral thermocouple. In one example, the modeled exhaust temperature may be a function of engine speed, engine load, air-fuel ratio, spark timing, and intake and exhaust valve timing. Method 300 proceeds to 312.

At 312, method 300 determines a rich misfire fraction. In one example, method 300 may determine the rich misfire fraction via the following equation:

$$Richfrac = \lambda_{error} \cdot Gas_{Error}$$

where Richfrac is the rich fraction misfire and the other variables are as previously described. The rich fraction misfire value may indicate that exhaust temperature is rising at about the time that one or more cylinders of the engine are operating with a rich air-fuel ratio that may contribute to engine misfire at low engine load. By combining the fuel target error with the exhaust gas temperature error, it may be possible to establish the presence or absence of engine misfire with a higher level of confidence. Method 300 proceeds to 314.

At 314, method 300 judges whether or not the rich misfire fraction value is greater than a threshold value (e.g., 30). The threshold value may be engine specific and it may also be a function of engine operating conditions (e.g., engine temperature and ambient air temperature). If method 300 judges that the rich misfire fraction value is greater than the threshold value, the answer is yes and method 300 proceeds to 318. Otherwise, the answer is no and method 300 proceeds to exit.

At 318, method 300 indicates the presence of one or more engine misfires. The indication may be provided via a human/machine interface, a light, an audible sound, or other known notification system/device. In addition, method 300 may perform mitigating actions to reduce the possibility of engine misfire. For example, method 300 may adjust spark timing (e.g., increase engine spark retard). Method 300 may also lean out the engine air-fuel ratio and adjust fuel injection start of injection timing. Method 300 proceeds to exit.

Figure 4:
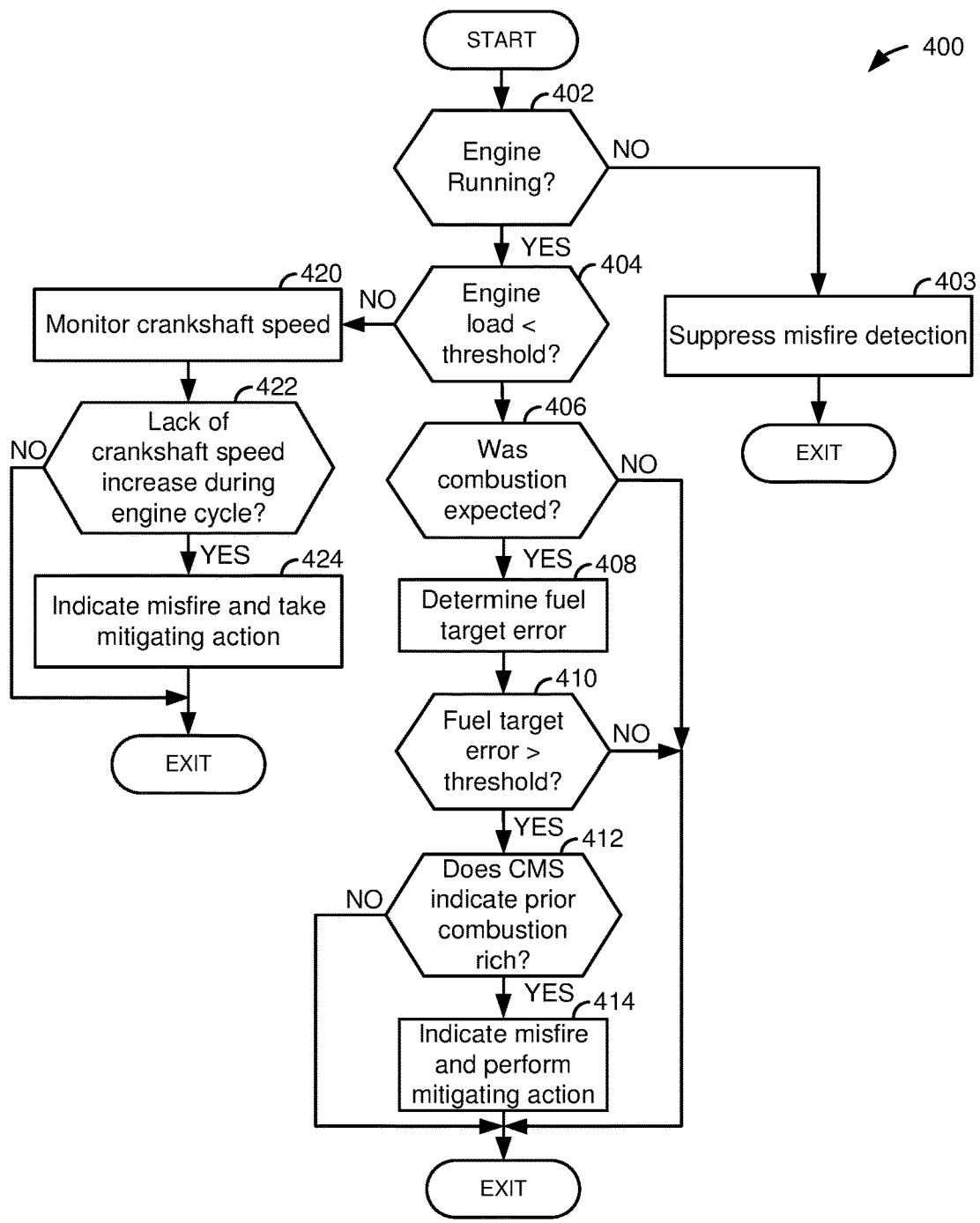
FIG. 4 shows a second method for determining a presence or absence of engine misfire.

Referring now to FIG. 4, a second method for determining a presence or absence of engine misfire is shown. The method may be included in the system of FIG. 1 as executable instructions stored in non-transitory memory of controller 12. The method of FIG. 4 may cause controller 12 to transform operating states of devices and actuators in the physical world.

At 402, method 400 judges whether or not the engine is running (e.g., combusting fuel and rotating). In one example, method 400 may judge that the engine is running when engine speed is greater than a threshold speed (e.g., 300 RPM). If method 400 judges that the engine is running, the answer is yes and method 400 proceeds to 404. Otherwise, the answer is no and method 400 proceeds to 403.

At 403, method 400 suppresses engine misfire detection. Misfire calculations are not determined and engine misfires are not indicated since the engine is stopped. Method 400 proceeds to exit.

At 404, method judges whether or not engine load is low. Method 400 may judge that engine load is low if engine load is less than a predetermined level (e.g., 0.2). If method 400 judges that engine load is low, the answer is yes and method 300 proceeds to 406. Otherwise, the answer is no and method 400 proceeds to 420.

At 420, method 400 monitors engine speed. Method 400 may monitor engine speed via an engine position sensor. Method 400 proceeds to 422.

At 422, method 400 judges if there is a lack of engine speed increase during a crankshaft angular interval where a cylinder is expected to fire. If so, the answer is yes and method 400 proceeds to 424. Alternatively, method 400 may judge if crankshaft speed is decreasing during a crankshaft interval. If so, the answer is yes and method 400 proceeds to 424. Otherwise, the answer is no and method 400 proceeds to exit.

At 424, method 400 indicates an engine misfire responsive to engine speed. If method 400 indicates misfire, method 400 may retard spark timing to reduce a possibility of additional misfires in the cylinder. Further, method 400 may adjust the engine's air-fuel ratio in response to the indication of misfire. For example, method 400 may adjust an air-fuel ratio of the engine or a particular cylinder to a leaner value to reduce a possibility of engine misfire. Method 400 proceeds to exit.

At 406, method 400 judges if combustion was expected. Combustion may be expected if the engine is not in a vehicle speed reducing engine fuel cut-off mode or in an engine fuel cut-off mode. If method 400 judges that combustion was not expected, the answer is no and method 400 proceeds to exit. If method 400 judges that combustion was expected (e.g., during a last most recent cylinder compression or expansion stroke), the answer is yes and method 400 proceeds to 408.

At 408, method 400 determines a fuel target error value. In one example, method 400 may determine the fuel target error value according to the following equation:

$$\lambda_{error} = \lambda_{Target} - \lambda_{actual}$$

where error is the fuel target error value, $\lambda_{Target}$ is the target Lambda value, $\lambda_{actual}$ is the actual Lambda value at the present time. The Lambda values $\lambda_{Target}$ and $\lambda_{actual}$ may be determined by dividing the target or actual air-fuel ratio by the stoichiometric air-fuel ratio of the fuel that is being combusted in the engine. For example, $\lambda_{Target}$=target air-fuel ratio/stoichiometric air-fuel ratio. Method 400 proceeds to 410.

At 410, method 400 judges if the fuel target error value is greater than a threshold value (e.g., 0.15). If so, the answer is yes and method 400 proceeds to 412. Otherwise, the answer is no and method 400 proceeds to exit.

At 412, method 400 judges if the catalyst monitor sensor (CMS) that is located downstream of the catalyst indicated that the most recent prior combustion in a cylinder was rich. The CMS sensor may indicate a prior rich combustion event via a cylinder that indicates an oxygen content in the exhaust gas as being less than an oxygen concentration for stoichiometric combustion conditions. If method 400 judges that the CMS sensor indicates that a most recent prior combustion in a cylinder was rich, the answer is yes and method 400 proceeds to 414. Otherwise, the answer is no and method 400 proceeds to exit.

At 414, method 400 indicates the presence of one or more engine misfires. The indication may be provided via a human/machine interface, a light, an audible sound, or other known notification system/device. In addition, method 400 may perform mitigating actions to reduce the possibility of engine misfire. For example, method 400 may adjust spark timing (e.g., increase engine spark retard). Method 400 may also lean out the engine air-fuel ratio and adjust fuel injection start of injection timing. Method 400 proceeds to exit.

Thus, the methods of FIGS. 3 and 4 provide for a method for operating an engine, comprising: combining a fuel target error and an exhaust temperature error to identify a presence of misfire in the engine; and adjusting operation of the engine in response to identifying the presence of misfire in the engine. The method includes where adjusting operation of the engine includes adjusting an air-fuel ratio of the engine. The method includes where adjusting operation of the engine includes adjusting spark timing of the engine. The method includes where the fuel target error is a target Lambda value minus an actual Lambda value. The method includes where the target Lambda value is a target air-fuel ratio divided by a stoichiometric air-fuel ratio. The method includes where the actual Lambda value is an actual air-fuel ratio divided by a stoichiometric air-fuel ratio. The method includes where the combining the fuel target error and the exhaust temperature error includes multiplying the fuel target error and the exhaust temperature error.

The methods of FIGS. 3 and 4 also provide for a method for operating an engine, comprising: identifying a presence or an absence of misfire in the engine responsive to a rich misfire fraction value being greater than a threshold value; and adjusting operation of the engine in response to identifying the presence of misfire in the engine. The method includes where the rich misfire fraction is generated via multiplying a temperature error and a fuel target error. The method includes where the fuel target error is a target Lambda value minus an actual Lambda value. The method includes where the identifying the presence or absence of misfire in the engine responsive to the rich misfire fraction is selectively performed based on a target fuel error exceeding a threshold level. The method includes where the identifying the presence or absence of misfire in the engine responsive to the rich misfire fraction is performed when engine load is less than a threshold value.

The methods of FIGS. 3 and 4 also provide for a method for operating an engine, comprising: identifying a presence or an absence of misfire in the engine responsive to a fuel target error and output of a catalyst monitor sensor, and adjusting operation of the engine in response to identifying the presence of misfire in the engine. The method includes where output of the catalyst monitor sensor indicates rich combustion in an engine. The method includes where the catalyst monitor sensor is positioned downstream of a catalyst. The method includes where the catalyst monitor is a two state device (e.g., indicates rich or lean).

As will be appreciated by one of ordinary skill in the art, methods described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating an engine, comprising:
   combining a fuel target error and an exhaust temperature error to identify a presence of misfire in the engine; and
   adjusting operation of the engine in response to identifying the presence of misfire in the engine.

2. The method of claim 1, where adjusting operation of the engine includes adjusting an air-fuel ratio of the engine.

3. The method of claim 1, where adjusting operation of the engine includes adjusting spark timing of the engine.

4. The method of claim 1, where the fuel target error is a target Lambda value minus an actual Lambda value.

5. The method of claim 4, where the target Lambda value is a target air-fuel ratio divided by a stoichiometric air-fuel ratio.

6. The method of claim 4, where the actual Lambda value is an actual air-fuel ratio divided by a stoichiometric air-fuel ratio.

7. The method of claim 1, where the combining the fuel target error and the exhaust temperature error includes multiplying the fuel target error and the exhaust temperature error.

8. A misfire detection system, comprising:
   an engine; and
   a controller including executable instruction stored in non-transitory memory that cause the controller to adjust operation of the engine in response to engine misfire, the engine misfire inferred from a fuel target error and an exhaust temperature error.

9. The misfire detection system of claim 8, where adjusting operation of the engine includes adjusting an engine air-fuel ratio.

10. The misfire detection system of claim 8, where adjusting operation of the engine includes adjusting spark timing.

11. The misfire detection system of claim 8, further comprising additional instructions to multiply the fuel target error and the exhaust temperature error to determine a rich misfire fraction.

12. The misfire detection system of claim 11, further comprising additional instructions to infer the engine misfire from the rich misfire fraction.

13. The misfire detection system of claim 12, where the engine misfire is inferred when the rich misfire fraction exceeds a threshold level.

14. The misfire detection system of claim 8, further comprising additional instructions to begin inferring the engine misfire in response to the fuel target error exceeding a threshold level.

15. The misfire detection system of claim 8, further comprising determining a presence or absence of engine misfire in response to engine crankshaft speed when engine load is greater than a threshold engine load.

16. A method for operating an engine, comprising:
   identifying a presence or an absence of misfire in the engine responsive to a rich misfire fraction value being greater than a threshold value, where the rich misfire fraction is generated via multiplying a temperature error and a fuel target error; and
   adjusting operation of the engine in response to identifying the presence of misfire in the engine.

17. The method of claim 16, where the fuel target error is a target Lambda value minus an actual Lambda value.

18. The method of claim 16, where the identifying the presence or absence of misfire in the engine responsive to the rich misfire fraction is selectively performed based on a target fuel error exceeding a threshold level.

19. The method of claim 16, where the identifying the presence or absence of misfire in the engine responsive to the rich misfire fraction is performed when engine load is less than a threshold value.

* * * * *